W. V. LEWIS.
FASTENING DEVICE FOR WHEELS.
APPLICATION FILED JAN. 13, 1911.
1,195,482.
Patented Aug. 22, 1916.
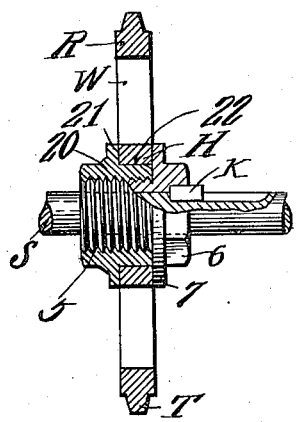
William V. Lewis,
Inventor
Witnesses
by
Attorneys

UNITED STATES PATENT OFFICE.

WILLIAM V. LEWIS, OF KANSAS CITY, MISSOURI.

FASTENING DEVICE FOR WHEELS.

1,195,482.

Specification of Letters Patent.   Patented Aug. 22, 1916.

Application filed January 13, 1911. Serial No. 602,470.

*To all whom it may concern:*

Be it known that I, WILLIAM V. LEWIS, a subject of the King of England, residing at Kansas City, in the county of Jackson and State of Missouri, have invented a new and useful Fastening Device for Wheels, of which the following is a specification.

The present invention appertains to means for mounting wheels upon shafts, and aims to provide novel and improved means for mounting a wheel upon a shaft, which device is simple yet effective.

The device is illustrated in the accompanying drawing, wherein the figure is a sectional view of the device, portions being shown in elevation.

There is illustrated a sprocket wheel W, which may be taken to represent any suitable wheel, which is to be mounted on the shaft S to rotate therewith. The wheel W illustrated has the rim R provided with the teeth T. A bushing 5 is fitted snugly upon the shaft and has at one end a wrench engaging head 6 and a flange 7, and a sleeve 20 is threaded upon said bushing and abuts against said flange. The sleeve has a shoulder 21, and a portion 22 between the shoulder 21 and flange 7 upon which portion 22 the hub H of the wheel is fitted between the said shoulder and said flange. A key K engages the shaft and bushing 5 adjacent the wrench engaging head, to lock the bushing to the shaft, and the sleeve 20 rotating with the wheel will be held in abutment with the flange 7, to secure the wheel hub between the shoulder 21 and flange 7, thus holding the parts together. The screw threads are so arranged with respect to the direction of rotation of the wheel, that the tendency of the wheel to rotate relative to the shaft will serve to hold the sleeve 20 threaded upon the bushing 5 and in abutment with the flange 7. The periphery of the sleeve is preferably made angular or non-circular where it fits within the hub, so that the wheel and sleeve cannot rotate relative to one another.

The present device can be used for various styles and sizes of wheels.

What is claimed as new is:—

In a device of the character described, a shaft, a bushing fitted snugly thereon and having at one end a wrench engaging head and a flange, a sleeve threaded upon said bushing and abutting against said flange, said sleeve having a shoulder, a wheel having a hub fitted upon said sleeve between said shoulder and flange, and means adjacent the wrench engaging head for engaging the shaft to prevent the rotation of said bushing relative to the shaft.

In testimony that I claim the foregoing as my own, I have hereto affixed my signature in the presence of two witnesses.

WILLIAM V. LEWIS.

Witnesses:
WALTER E. BELCHER,
P. A. HIGINBOTHAM.